(12) United States Patent
Morton et al.

(10) Patent No.: US 8,458,588 B1
(45) Date of Patent: Jun. 4, 2013

(54) DETERMINING CONTENT LAYOUT POSITIONS PRODUCED BY A LAYOUT ENGINE

(75) Inventors: Michael S. Morton, Lyme, NH (US); Jeremy Faller, Braintree, MA (US)

(73) Assignee: Google Inc., Mountain View, CA (US)

( * ) Notice: Subject to any disclaimer, the term of this patent is extended or adjusted under 35 U.S.C. 154(b) by 160 days.

(21) Appl. No.: 13/035,666

(22) Filed: Feb. 25, 2011

(51) Int. Cl.
*G06F 17/21* (2006.01)

(52) U.S. Cl.
USPC .......................................... 715/256

(58) Field of Classification Search
USPC .......................................... 715/256
See application file for complete search history.

(56) References Cited

U.S. PATENT DOCUMENTS

| | | | |
|---|---|---|---|
| 6,229,525 B1 | 5/2001 | Alexander | |
| 7,107,533 B2 * | 9/2006 | Duncan et al. | 715/727 |
| 7,559,034 B1 * | 7/2009 | Paperny et al. | 715/803 |
| 2004/0075699 A1 * | 4/2004 | Franchi et al. | 345/860 |
| 2004/0080532 A1 * | 4/2004 | Cragun et al. | 345/745 |
| 2004/0205542 A1 * | 10/2004 | Bargeron et al. | 715/512 |
| 2007/0019889 A1 | 1/2007 | Miller et al. | |
| 2008/0011819 A1 | 1/2008 | Patil et al. | |

OTHER PUBLICATIONS

Bradski, G., "OpenCVWiki," opencvwillowgarage.com, Apr. 1, 2011, 2 pages, [online] [retrieved on May 11, 2010] retrieved from the internet <URL:http://opencv.willowgarage.com/wiki/>.
Sisak, S., "Nov. 97—Tips", MacTech Magazine, Tips & Tidbits, 1997, 3 pages, vol. 13, Issue 11.
"Hough transform," Wikipedia, Apr. 3, 2011, 7 pages, [online] [retrieved on May 11, 2010] retrieved from the internet <URL:http://en.wikipedia.org/wiki/Hough_transform>.
"Combining character," Wikipedia, Mar. 9, 2011, 3 pages [online] [retrieved on May 11, 2010] retrieved from the internet <URL:http://en.wikipedia.org/wiki/Combining_diacritical_mark>.
"Corner detection," Wikipedia, May 1, 2011, 5 pages, [online] [retrieved on May 11, 2010] retrieved from the internet <URL:http://en.wikipedia.org/wiki/Corner_detection>.
"CSS Multi-column Layout Module," W3C, 2011, 16 pages, [online] [retrieved on May 11, 2010] retrieved from the internet <URL:http://www.w3.org/TR/css3-multicol/>.
"Mathematical morphology," Wikipedia, Apr. 6, 2011, 9 pages, [online] [retrieved on May 11, 2010] retrieved from the internet <URL:http://en.wikipedia.org/wiki/Morphological_image_processing>.
"Point in Polygon aka hit test," Stackoverflow, 2011, 8 pages, [online] [retrieved on May 10, 2011] retrieved from the internet <URL:http://stackoverflow.com/questions/217578/point-in-polygon-aka-hit-test>.

* cited by examiner

*Primary Examiner* — Frank D Mills
(74) *Attorney, Agent, or Firm* — Fenwick & West LLP (57) ABSTRACT

A position determination module determines positions that components of content—such as individual words of textual content—will have when rendered by a layout engine. Specifically, the position determination module modifies visual attribute values of the content components such that the components when rendered will have different appearances, but the same positions, as they would if rendered without the modified visual attribute values. The position determination module then causes the layout engine to render the content with the modified visual attribute values and identifies the various values of the visual attributes within the rendered content and notes the positions at which they occur. Based on its knowledge of which visual attribute values are associated with which content components, the position determination module in turn associates the positions with the corresponding content components. Thus, positions of content components within rendered images of the content can be determined.

17 Claims, 5 Drawing Sheets

DETERMINING CONTENT LAYOUT POSITIONS PRODUCED BY A LAYOUT ENGINE

BACKGROUND

1. Technical Field

The invention generally relates to displaying digital documents, and in particular to layout of content such as text for display on client devices.

2. Background Information

Rendering content within an application can be a challenging task. For example, when rendering text or other components of content of a digital book, the text must be appropriately split into words and lines based on the length of the individual words and on the font, spacing, and other textual properties. Further, the appropriate portion of the text must be displayed within the current visible region of the application's text area, which may in turn depend on the current size of the application window. Thus, many application developers rely on an existing layout engine provided by the operating system or by a third party to handle the layout of application content. Examples of such layout engines include WEBKIT, KHTML, Gecko, and the like.

However, layout engines often merely render the content provided to them as input by the developers, without providing any mechanism to determine the positions where the various components of the content, such as individual words of text, were rendered by the layout engine. Nor is it a simple matter for application developers to compute such positions themselves, since the layout algorithms used by the layout engines are often complex, taking into account a large number of variables. Such layout position information would often be of value to application developers for performing a number of useful tasks, such as performing additional rendering not performed by the layout engine itself (e.g., adding highlights to individual words), scrolling to the appropriate page in response to a search for text of interest, and the like. However, without the ability to obtain layout position information for the various content components of interest, it is completely impractical to perform these useful tasks.

SUMMARY OF THE INVENTION

A position determination module determines positions that components of content—such as figures, images, or individual words of textual content of a digital book—will have when rendered by a layout engine authored independently of the layout module. Specifically, the position determination module modifies visual attribute values of the content components such that the components when rendered will have different appearances, but the same positions, as they would if rendered without the modified visual attribute values. The position determination module then causes the layout engine to render the content with the modified visual attribute values and identifies the various values of the visual attributes within the rendered content and notes the positions at which they occur. Based on its knowledge of which visual attribute values are associated with which content components, the position determination module in turn associates the positions with the corresponding content components. Thus, positions of content components within rendered images of the content can be determined, even when the layout engine that produces the rendered image does not provide the position information.

The learned associations between content components and rendered positions can then be used in various ways. For example, additional graphical properties, such as highlighting, can be added to content components using the learned positions of the components.

In one embodiment, the content comprises markup tags, such as HTML or XML tags, that when rendered generate a viewable image of the content. For example, the content might comprise HTML with markup and associated text that when rendered generates a viewable book, or some unit thereof such as a chapter or page.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Environment

Figure 1:
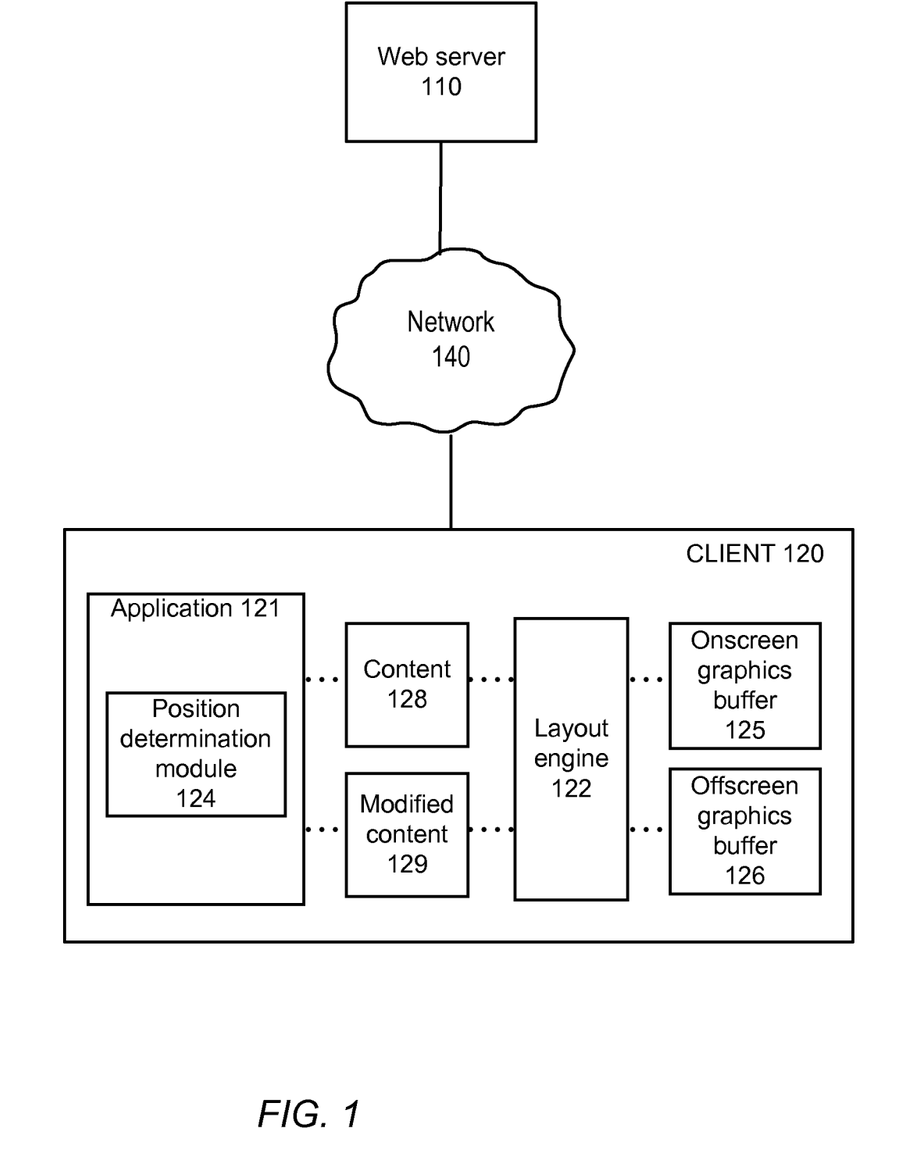
FIG. 1 is a high-level block diagram of a computing environment, according to one embodiment.

FIG. 1 is a high-level block diagram that illustrates a client device 120 that renders content, such as the content of a digital book or article, using a layout engine 122 and additionally determines layout positions of rendered components using a position determination module 124, according to one embodiment. As used herein, the term "content" refers to any data of interest that may be visually represented within an application display, and the term "content component" (or simply "component") refers to any distinct portion of the content for which layout position information may be sought, such as individual textual words or paragraphs, images, figures, equations, or the like. The term "layout position" refers to information providing some indication of where a content component is located within a rendered image of the content, such as a pixel position with respect to the top-left corner of the application window or page in which the component is rendered, a page number, a combination of pixel position and page, or the like.

More specifically, the client device 120 executes an application 121 in which content is rendered, e.g., within an application window. The application 121 calls the layout engine 122 to render the content, passing the content to the layout engine 122 as input. One example of the application 121 and client device 120 is the GOOGLE BOOKS application executing on a mobile device such as an IPHONE or a device based on the ANDROID mobile operating system. Other examples of the application 121 might include a web browser, an email client, or a help system of another application executing on a desktop or laptop computer.

The layout engine 122 is a software component that takes content as input and produces a graphical, rendered image of that content. For example, the content can comprise textual markup, such as HTML or XML, or other content with associated markup, such as marked up image files. The content may additionally comprise formatting information, such as cascading style sheets (CSS) or transformations in extensible stylesheet language (XSL), formatting characteristics to set style properties for a given range of text (e.g., set characters 15-42 to bold), or the like. Thus, the content typically does not itself have any associated visual appearance until it is rendered by the layout engine 122. The content may take any form when rendered, such as text, images, video, or the like, as determined by the content itself. In one embodiment, the application 121 obtains the content from an external source, such as a web server 110 accessible over a network 140. In one embodiment, the layout engine 122 is independent of the application 121, in that it is authored by a different person or organization. In consequence the application 121 lacks access to the internal data structures of the layout engine 122 and cannot (for example) determine positions at which the layout engine laid out content components, unless the layout engine explicitly provides such capability as part of its API.

The layout engine 122 places the rendered image of the content within a graphics buffer, such as a portion of main memory or video memory. The graphics buffer may be an onscreen graphics buffer 125 corresponding directly to a display of the client device 120, such that rendering the image within the graphics buffer leads the rendered image to be displayed immediately on the display. Alternatively, the graphics buffer may be an offscreen graphics buffer 126 representing an offscreen image that need not be displayed on the display. In one embodiment, the layout engine 122 renders original content in the onscreen graphics buffer 125 after first rendering a modified version 129 of the original content in the offscreen graphics buffer 126, such that the various content components are displayed at the same positions in both the offscreen graphics buffer and the onscreen graphics buffer. The layout engine 122 may then perform additional rendering, such as adding highlights to individual content components in the onscreen graphics buffer 125.

The application 121 has access to a position determination module 124 that enables the determination of positions of the various content components as rendered by the layout engine 122, even though the layout engine 122 does not itself provide these positions. The position determination module 124 may be an internal component of the application 121, or it may be a stand-alone module that may be accessed and used by any number of distinct applications. The operation of the position determination module 124 is described in more detail below with respect to FIG. 2.

The network 140 represents the communication pathways between the client 120 and the web server 110. In one embodiment, the network 140 uses standard Internet communications technologies and/or protocols. Thus, the network 140 can include links using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

In an example embodiment referenced throughout the remainder of this application, the application 121 is an application for reading digital books, such as a web browser for a desktop or laptop computer, or a specialized book-reading application for a mobile device such as an IPHONE. The content in this embodiment is textual markup such as HTML or XML, or text with formatting characteristics (e.g., set characters 15-42 to bold), and when rendered produces primarily textual content, optionally including additional non-textual content, such as images. The content components are individual textual units, such as individual words or characters, or larger units such as paragraphs, columns, or the like. However, it is appreciated that this embodiment is purely for the sake of example, and the application, content, and content components may be of different types, as described above.

Figure 2:
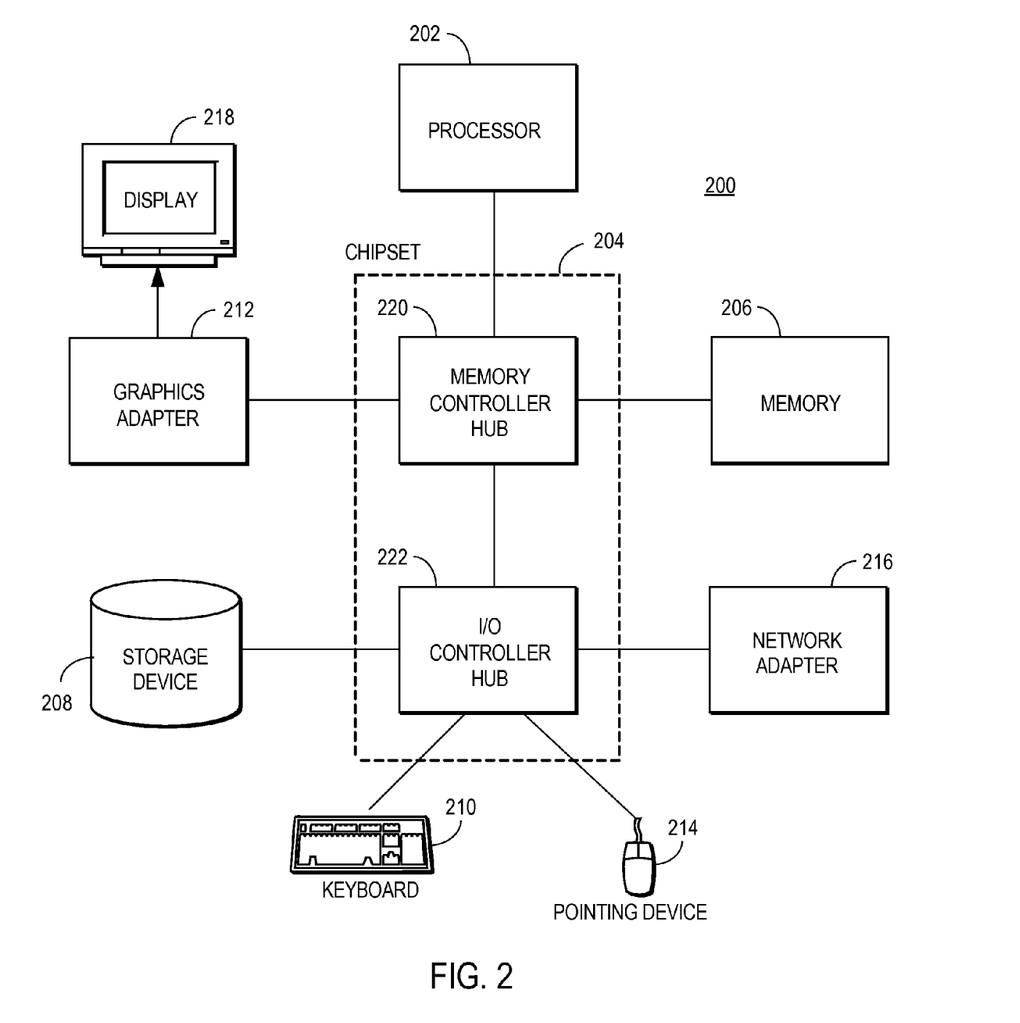
FIG. 2 is a high-level block diagram illustrating an example of a computer, according to one embodiment.

FIG. 2 is a high-level block diagram illustrating physical components of a computer 200 used as part of the client device 120 and/or the web server 110 from FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204. The graphics buffers 125, 126 of FIG. 1 may be implemented, for example, within the memory 206 or the graphics adapter 212.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
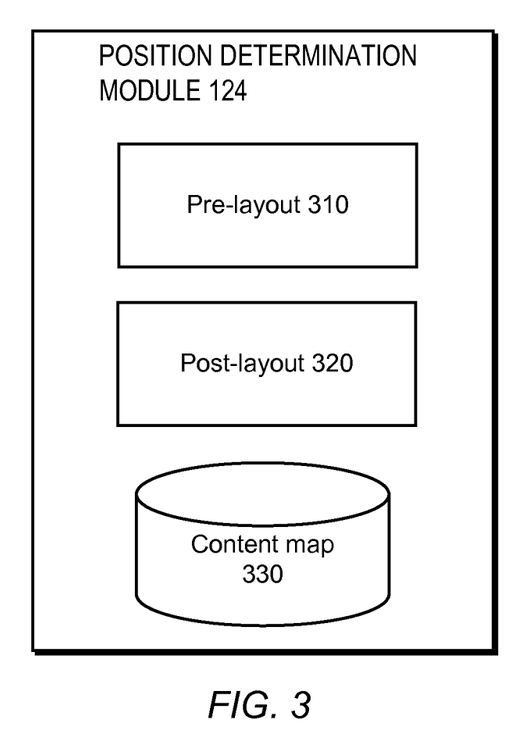
FIG. 3 is a high-level block diagram illustrating modules within a position determination module, according to one embodiment.

FIG. 3 is a high-level block diagram illustrating modules within the position determination module 124, according to one embodiment. The position determination module 124 comprises a pre-layout module 310 that adds, to content components, visual attributes that do not affect the positions at which the components are laid out in a rendered image of the content, or that modifies existing visual attributes in a way that does not affect the positions. The position determination module 124 additionally comprises a post-layout module 320 that detects values of the added (or modified) visual attributes, and a content map 330 that associates content components, visual attribute values, and positions.

More specifically, the pre-layout module 310 adds (or modifies) values of one or more visual attributes to each content component whose position is to be later determined, such that the content components can be identified based solely on their visual attributes. In one embodiment, each application may define the types and/or numbers of content components to identify, such as textual word components in a book-reading application. In one embodiment, the pre-layout module 310 stores identifiers of content components (e.g., an integer corresponding to the order of the content component within the content) in the content map 330 in association with identifiers of the visual attributes (e.g., a unique RGB color value) added to those components. Not all the associations need be explicitly stored; rather, some associations may be partially or entirely implicit, such as the associations of a sequence of consecutive word numbers and corresponding colors, such as the words with indexes 1, 2, and 3 with the colors 0x00000001, 0x00000002, and 0x00000003.

The type of visual attribute added may vary in different embodiments. In one embodiment, the visual attribute is the background color of the content component, and the attribute's values represent different colors. In other embodiments, the visual attribute is the foreground color of the content component, foreground alpha value (e.g., transparency), background alpha value, or any other change in one or more visual attributes that does not affect layout positions of the content components.

The manner in which the visual attribute is added may also vary in different embodiments. In the example embodiment in which the content is embodied in a document comprising markup language such as HTML or XML, the pre-layout module 310 adds the visual attributes by adding (or changing) specific markup attributes to the markup elements representing the content components. For example, in one embodiment in which the content components are individual words, the pre-layout module 310 scans the content document, adding markup tags as needed to ensure that each individual word is described by its own tag, and assigning a distinct value to the background color attribute of each tag and setting the foreground color to be the same as the background color, such that the entire word area has a uniform color. In such an embodiment, the identifier of the color visual attribute might be the hex string specifying the background color in terms of its red, green, and blue components, such as 0xFF0000 for the background color red, and the identifiers of the words might be increasing integer indexes, such as 0 for the first word, 1 for the second word, and so on. The colors could likewise be treated as numbers and incremented by 1, or otherwise changed so as to create distinguishable colors. In this example, the 19th, 20th, and 21st words might be associated in the content map 330 with the background colors 0x000012, 0x000013, and 0x000014x (the 19th, 20th, and 21st colors expressed in hexadecimal, starting from −0x000000)—i.e., the content map might contain (at least implicitly) association pairs <18, 0x000012>, <19, 0x000013>, and <20, 0x000014> for these three words. In one embodiment, the tags for each word are the HTML "span" tag, and thus the tag for the 19th 24207/16892/DOCS/2338006 word in the above example might be <span style="background-color: #000012">Chesterton</span>, assuming that the 19th word is "Chesterton."

Once the pre-layout module 310 has added visual attributes to each content component of interest, it causes the layout engine 122 to render this modified content—including the added (or modified) visual attributes—into a graphics buffer. In one embodiment, the graphics buffer is the offscreen buffer 126, and hence rendering content to it does not cause an update of the display. Thus, the offscreen graphics buffer 126 is examined only by the post-layout module 320, and users will not actually see the content rendered with the visual attributes, such as different background colors for each component.

The post-layout module 320 analyzes the rendered content in the offscreen graphics buffer 126. Specifically, the post-layout module 320 identifies each distinct visual attribute value, and hence the content component with which it is uniquely associated. The post-layout module 320 then identifies the position at which the visual attribute was found and associates the position with the visual attribute value in the content map 330. The position can be expressed in different ways in different embodiments, such as an absolute pixel position with respect to the beginning of the textual area (e.g., the top-left, for western languages), a page number, the coordinates of a bounding box containing the component, or any combination thereof, such as a combination of a page number and an absolute pixel position with respect to the beginning of the page. Continuing the above example, if the colors 0x000012, 0x000013, and 0x000014 were respectively found at positions [50, 102], [80, 102], and [95, 102], then the post-layout module 320 would produce the association triples <18, 0x000012, [50, 102]>, <19, 0x000013, [80, 102]>, <20, 0x000014, [95, 102]>, thereby associating the content components represented by the first item of each triple with the position represented by the last item of the triple.

The post-layout module 320 may take different approaches to identifying the different values of the visual attribute, such as the different colors. In one embodiment, the post-layout module 320 scans through pixels of the rendered content in the offscreen graphics buffer 126, identifying changes in pixel values. For example, in one embodiment the post-layout module 320 scans through successive pixels in each horizontal row of pixels (or vertical column of pixels, in the case of languages with different directionality), in each row noting different background colors (or other visual attributes) that indicate the presence of different content components.

Figure 4:
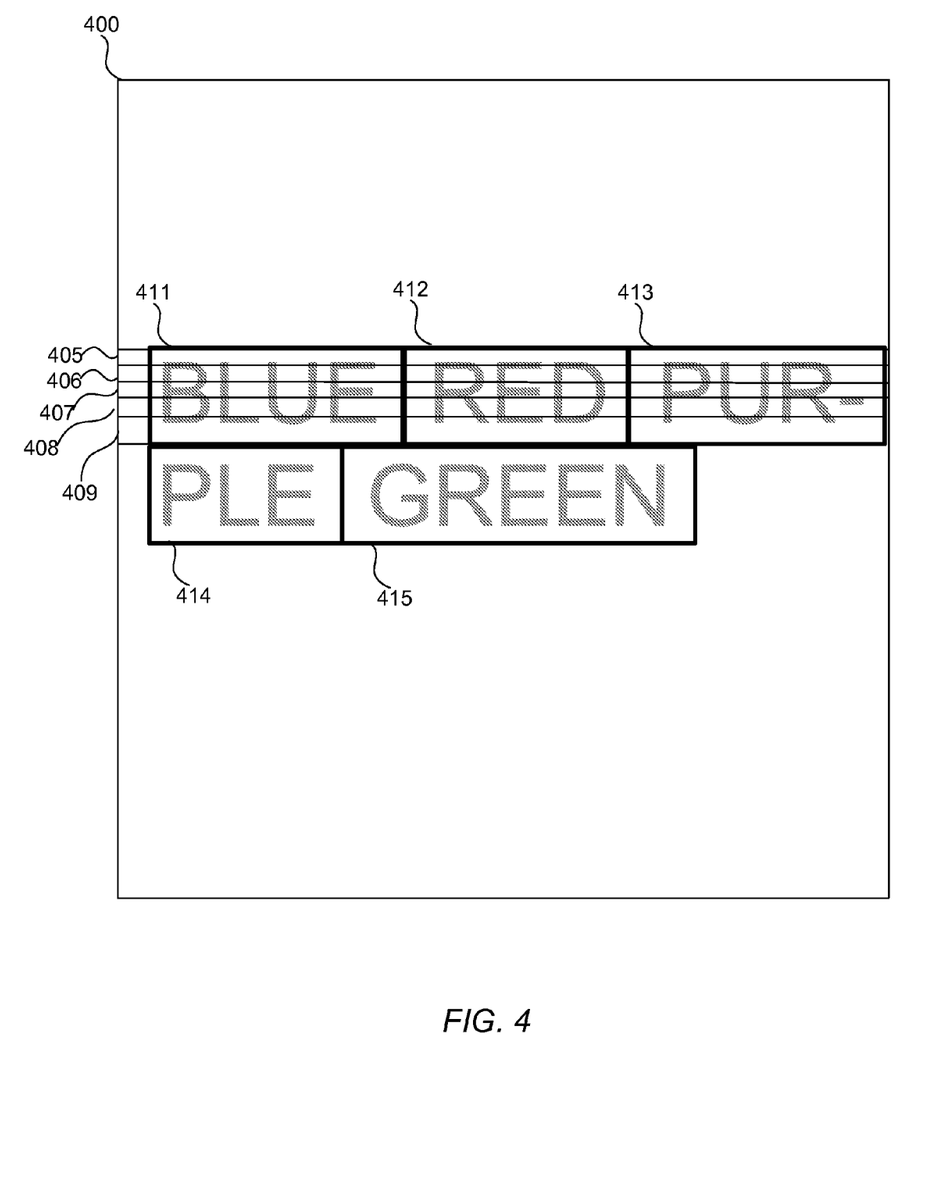
FIG. 4 illustrates a rendering of modified content analyzed by the position determination module of FIG. 3, according to one embodiment.

FIG. 4 illustrates a rendering of modified content as stored in the offscreen graphics buffer 126. Specifically, FIG. 4 shows a page 400 of a sample rendered document that the post-layout module 320 analyzes. The page 400 includes several regions 411-415 corresponding to textual word content components—namely, the words "BLUE", "RED", "PURPLE", and "GREEN"; for purposes of example, although not illustrated within FIG. 4, assume that each word has a background color that corresponds to its name (e.g., blue for the first word, red for the second, etc.), which fills the entire region 411-415 corresponding to the word, and that the text of the word itself is drawn in the same color as the background. In one embodiment, the post-layout module 320 scans across the successive pixels of each successive line (e.g., lines 405, 406, 407), noting changes in pixel color. For example, in the line 405, around the left edge of the word "BLUE", the pixels become blue due to the blue background color for the word, and continue to be blue until the right edge of the word, at which point the color changes to red. This remains true for each of lines 406-409, after which the background color changes to purple and/or green. In one embodiment, the post-layout module 320 notes the top-left, top-right, bottom-left, and bottom-right pixel location for each color, thereby storing a bounding box for each word corresponding to the color. In another embodiment, in order to address split words, such as the word "PURPLE" that is split across two lines, the post-layout module 320 stores multiple distinct bounding boxes for a word (or other content component), such as the boxes 413 and 414 for the single word "PURPLE". In some embodiments, the post-layout module 320 need not scan every pixel or every line. For example, after scanning line 405, the post-layout module 320 might descend four lines, to line 409, and determine whether the background at a given horizontal location is still blue, continuing if so, and if not performing a linear search to find another line with a blue background at that horizontal location.

Returning again to FIG. 3, in one embodiment, once the post-layout module 320 has associated the identified positions with the corresponding visual attributes (and hence also with the content components already associated with the visual attributes), it causes the layout engine to render the original content 128 to the onscreen graphics buffer 125. This in turn causes the original content 128 to be rendered on the display of the client device 120. In addition, the application 121 can use the position data in the content map 330 to perform additional operations, such as highlighting or otherwise emphasizing particular words or other content components, or determining (e.g., in response to a mouse click or touch of a screen) which words or other content components a user was attempting to select. Referring again to the above examples, to highlight the 19th word in the document, the application 121 could refer to the entry for the 19th word—namely, <18, 0x000012, [50, 102]>, given the zero-based word numbering—and determine that the 19th word begins at 50 pixels in and 102 pixels down from the upper-left corner of the enclosing text region. Then, the application 121 could perform the desired highlight starting at that location.

Figure 5:
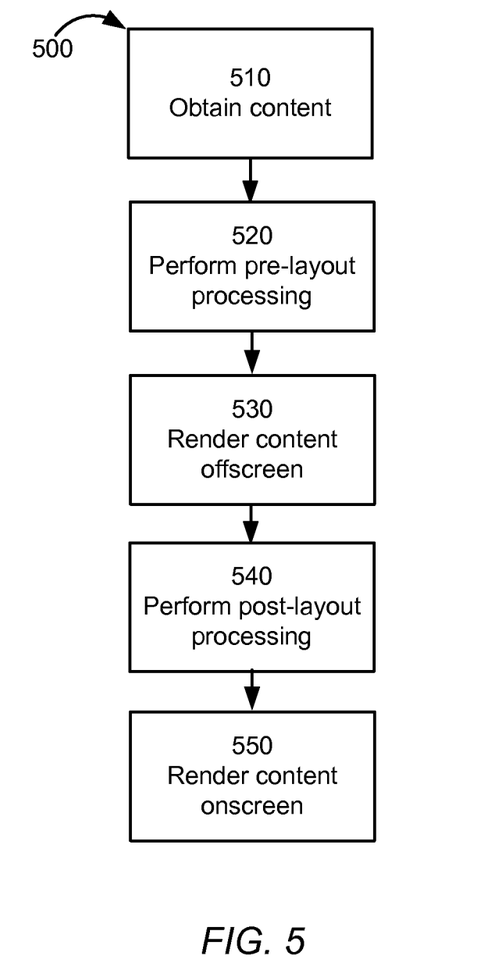
FIG. 5 is a flow diagram that illustrates content processing performed in order to identify positions of content components, according to one embodiment.

FIG. 5 is a flow diagram that illustrates content processing performed in order to identify positions of content components, according to one embodiment. Initially, content obtaining 510 is performed, in which the original, unmodified content 128 is obtained, either from a remote source such as the web server 110 of FIG. 1, or from a local store on the client 120.

The position determination module 124 performs pre-layout processing 520—that is, processing prior to layout of the content by the layout engine 122. Specifically, the position determination module 124 modifies visual attribute values of content components of the original content 128, such as changing the background color of individual words. The changes in the visual attribute values of the content components performed by the position determination module 124 do not modify layout positions of the original content when rendered by the layout engine 122, and thus the content components have the same positions in the rendered versions of both the original content 128 and the modified content 129. Additionally, the position determination module 124 stores associations of the modified visual attribute values with the content components to which they correspond in the content map 330. For example, the content map 330 could store that a particular word has a corresponding unique background color.

The position determination module 124 operates to render content offscreen 530 so that the modified content 129 is rendered to the offscreen graphics buffer 126 by calling the layout engine and passing it the modified content as input. Since the buffer is offscreen, rendering to it need not cause the display 218 of the client 120 to be updated accordingly.

The position determination module 124 then performs post-layout processing 540 to identify positions of regions within the modified rendering that have the modified visual attributes. For example, the position determination module 124 can scan the modified rendering, looking for the various background colors specified by the visual attribute values listed in the content map 330. When the position determination module 124 finds a particular visual attribute value, the position (e.g., pixel coordinate, or page number) at which the attribute was found is identified, and the position is associated with a content component with reference to the content map 330, which associates visual attribute values with particular content components.

The position determination module 124 may then render 550 the original content onscreen by rendering it to the onscreen graphics buffer 125, and thereby updating the display 218 of the client device 120. The application 121 can then perform additional actions using the associations of content components with identified positions stored in the content map 330, such as adding highlighting to word content components at locations corresponding to the identified positions, scrolling to the proper page in response to a user search for particular word content components, determining which content component a user clicked on or otherwise selected, and the like.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for processing digital documents and reformatting them for display on client devices. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for determining positions at which a plurality of content components within original content of a digital publication are rendered by an independent layout engine, comprising:
    producing modified content by modifying visual attribute values of the plurality of content components of the original content, the content components of the original content being described by markup tags, the modifying comprising at least one of modifying the markup tags and adding additional markup tags associated with the content components, wherein the modifying does not modify layout positions of the content components of the original content when rendered by the layout engine;
    associating the modified visual attribute values with the content components to which they correspond;
    producing a modified rendering by rendering the modified content to an offscreen graphics buffer using the layout engine;
    identifying changes in pixel values over the modified rendering;
    identifying positions of regions within the modified rendering of the offscreen graphics buffer that have the modified visual attribute values, based on the identified changes in pixel values; and
    associating the identified positions with content components based on the associations of the modified visual attribute values with the content components.

2. The computer-implemented method of claim 1, further comprising:
    producing an unmodified rendering by rendering the original content to an onscreen graphics buffer using the layout engine; and
    performing additional rendering with respect to the rendered versions of the components within the unmodified rendering, wherein the additional rendering is based at least in part on the identified positions of the content components.

3. The computer-implemented method of claim 1, wherein the original content comprises textual words and associated formatting characteristics that when rendered by the layout engine produce rendered text, and wherein the content components comprise individual ones of the textual words.

4. The computer-implemented method of claim 1, wherein the identified positions include page numbers of pages on which the content components were rendered in the modified rendering.

5. The computer-implemented method of claim 1, wherein the identified positions include pixel coordinates of locations at which the content components were rendered in the modified rendering.

6. The computer-implemented method of claim 1, wherein modifying visual attribute values of content components of the original content comprises at least one of adding or modifying background colors associated with the content components of the original content.

7. The computer-implemented method of claim 1, wherein identifying changes in pixel values comprises analyzing changes in successive pixel values of a line of pixels in the modified rendering.

8. A non-transitory computer-readable storage medium storing a computer program executable by a processor for determining positions at which a plurality of content components within original content of a digital publication are rendered by an independent layout engine, actions of the computer program comprising:
    producing modified content by modifying visual attribute values of the plurality of content components of the original content, the content components of the original content being described by markup tags, the modifying comprising at least one of modifying the markup tags and adding additional markup tags associated with the content components, wherein the modifying does not modify layout positions of the content components of the original content when rendered by the layout engine;
    associating the modified visual attribute values with the content components to which they correspond;
    producing a modified rendering by rendering the modified content to an offscreen graphics buffer using the layout engine;
    identifying changes in pixel values over the modified rendering;
    identifying positions of regions within the modified rendering of the offscreen graphics buffer that have the modified visual attribute values, based on the identified changes in pixel values; and
    associating the identified positions with content components based on the associations of the modified visual attribute values with the content components.

9. The non-transitory computer-readable storage medium of claim 8, the actions of the computer program further comprising:

producing an unmodified rendering by rendering the original content to an onscreen graphics buffer using the layout engine; and performing additional rendering with respect to the rendered versions of the components within the unmodified rendering, wherein the additional rendering is based at least in part on the identified positions of the content components.

10. The non-transitory computer-readable storage medium of claim 8, wherein the original content comprises textual words and associated formatting characteristics that when rendered by the layout engine produce rendered text, and wherein the content components comprise individual ones of the textual words.

11. The non-transitory computer-readable storage medium of claim 8, wherein the identified positions include page numbers of pages on which the content components were rendered in the modified rendering.

12. The non-transitory computer-readable storage medium of claim 8, wherein identifying changes in pixel values comprises analyzing changes in successive pixel values of a line of pixels in the modified rendering.

13. A computer system for determining positions at which a plurality of content components within original content of a digital publication are rendered by an independent layout engine, the system comprising:
   a computer processor; and
   a computer program executable by the computer processor and performing actions comprising:
      modifying visual attribute values of the plurality of content components of the original content, thereby producing modified content, the content components of the original content being described by markup tags, the modifying comprising at least one of modifying the markup tags and adding additional markup tags associated with the content components, wherein the modifying does not modify layout positions of the content components of the original content when rendered by the layout engine;
      associating the modified visual attribute values with the content components to which they correspond;
      producing a modified rendering by rendering the modified content to an offscreen graphics buffer using the layout engine;
      identifying changes in pixel values over the modified rendering;
      identifying positions of regions within the modified rendering of the offscreen graphics buffer that have the modified visual attribute values, based on the identified changes in pixel values; and
      associating the identified positions with content components based on the associated of the modified visual attribute values with the content components.

14. The computer system of claim 13, the actions of the computer program further comprising:
   producing an unmodified rendering by rendering the original content to an onscreen graphics buffer using the layout engine; and
   performing additional rendering with respect to the rendered versions of the components within the unmodified rendering, wherein the additional rendering is based at least in part on the identified positions of the content components.

15. The computer system of claim 13, wherein the original content comprises textual words and associated formatting characteristics that when rendered by the layout engine produce rendered text, and wherein the content components comprise individual ones of the textual words.

16. The computer system of claim 13, wherein the identified positions include page numbers of pages on which the content components were rendered in the modified rendering.

17. The computer system of claim 13, wherein identifying changes in pixel values comprises analyzing changes in successive pixel values of a line of pixels in the modified rendering.

* * * * *